(12) United States Patent
Diez Garcia et al.

(10) Patent No.: US 10,921,198 B2
(45) Date of Patent: Feb. 16, 2021

(54) DEVICE FOR MEASURING THE PRESSURE AND TEMPERATURE OF FLUIDS

(71) Applicant: CEBI ELECTROMECHANICAL COMPONENTS SPAIN, S.A., Villatuerta (ES)

(72) Inventors: Sergio Diez Garcia, Villatuerta (ES); Ignacio Ardaiz Usoz, Villatuerta (ES); Lesmes Nicolas Haro, Villatuerta (ES)

(73) Assignee: CEBI ELECTROMECHANICAL COMPONENTS SPAIN, S.A., Villatuerta (ES)

( * ) Notice: Subject to any disclaimer, the term of this patent is extended or adjusted under 35 U.S.C. 154(b) by 0 days.

(21) Appl. No.: 16/539,154

(22) Filed: Aug. 13, 2019

(65) Prior Publication Data

US 2020/0072685 A1 Mar. 5, 2020

(30) Foreign Application Priority Data

Aug. 28, 2018 (ES) .............................. ES201831309U

(51) Int. Cl.
*G01L 1/14* (2006.01)
*G01K 7/16* (2006.01)
*G01L 1/20* (2006.01)

(52) U.S. Cl.
CPC ................ *G01L 1/14* (2013.01); *G01K 7/16* (2013.01); *G01L 1/20* (2013.01)

(58) Field of Classification Search
CPC ................ G01L 1/14; G01L 1/20; G01K 7/16
USPC ...................................... 73/862.626
See application file for complete search history.

(56) References Cited

U.S. PATENT DOCUMENTS

| | | | | |
|---|---|---|---|---|
| 3,566,694 A * | 3/1971 | Vogel | .................. | G01L 7/16 73/746 |
| 6,209,399 B1 * | 4/2001 | Probst | ................. | G01L 19/0084 73/756 |
| 6,508,130 B2 * | 1/2003 | Werner | ............... | G01L 19/0654 73/756 |
| 7,152,477 B2 * | 12/2006 | Banholzer | ............. | G01L 9/0075 73/700 |
| 7,240,557 B2 * | 7/2007 | Muller | ................ | B29C 63/0065 73/706 |
| 7,370,536 B2 * | 5/2008 | Ueyanagi | ............ | G01L 19/0084 73/715 |
| 7,600,433 B2 * | 10/2009 | Koehler | ................ | G01L 19/147 73/753 |
| 8,051,719 B2 * | 11/2011 | Bigliati | ................. | G01L 19/143 73/756 |

(Continued)

*Primary Examiner* — Octavia Hollington
(74) *Attorney, Agent, or Firm* — Lucas & Mercanti, LLP

(57) ABSTRACT

A device for measuring the pressure and temperature of fluids is provided, which has a temperature-sensitive element and a pressure-sensitive cell which are arranged connected to an electronic circuit, connected to which, in turn, are terminals of a connector by which a metal body is closed, in which the element and the cell are housed; the cell being housed in a cavity defined on one side of a plastic body through which electric conductors pass, which connect the element to the electronic circuit; the cell resting on a seal disposed between the cell and the base of the cavity, a wedge element placed over the cell which rests against the cell to compress the seal to thereby provide a seal around the mouth of a conduit through which the pressure of the fluid to be controlled is transmitted onto the cell.

4 Claims, 8 Drawing Sheets

(56) References Cited

U.S. PATENT DOCUMENTS

| | | | |
|---|---|---|---|
| 8,714,019 B2 * | 5/2014 | Kopp | G01L 19/14 73/708 |
| 2020/0033215 A1 * | 1/2020 | Diez Garcia | G01L 19/148 |

* cited by examiner

DEVICE FOR MEASURING THE PRESSURE AND TEMPERATURE OF FLUIDS

CROSS-REFERENCE TO RELATED APPLICATION

This application claims the benefit of priority from Spanish Patent Application No. U201831309, filed Aug. 28, 2018, the contents of which is incorporated herein by reference.

TECHNICAL FIELD

The present invention is related to devices for measuring the pressure and temperature of fluids in sectors such as the automotive and industrial sectors and which can be used in applications such as fuel filters, combustion engines, refrigeration circuits, air conditioning, etc., proposing a measuring device of that type which encompasses in a single unit the functions of measuring pressure and measuring temperature, made with advantageous functional and constructive features.

STATE OF THE ART

In the automotive and industrial sectors, as well as others, there are functionalities that require the control of the temperature and pressure of fluids in circuits for different applications, and there are measuring devices that allow said functions to be effectively carried out.

However, it is currently necessary in many cases to integrate the two functions of measuring temperature and measuring pressure into a single device, to thereby achieve more compact and less expensive application systems.

To this end, measuring devices have been developed that include the function of measuring temperature by means of a temperature-sensitive element, such as a negative temperature coefficient (NTC), which is a resistance of a negative temperature coefficient with respect to the variation of the resistance thereof, and the function of measuring pressure by means of a ceramic capacitive sensor element.

In an embodiment of said measuring devices, such as the one envisaged by U.S. Pat. No. 8,935,961B2, the temperature-sensitive element is arranged in a plastic body, in which said element is housed in a hollow, from which electric cables come out that connect the temperature-sensitive element to an electronic circuit which, in turn, is connected to a connection connector of the measuring device in the system of application, the electric cables passing through hollow conduits defined in the plastic body.

With said arrangement, due to the nature of the constructive solution, it is very difficult to apply thermal grease to facilitate thermal transmission from the fluid to be controlled to the temperature-sensitive element, which reduces the efficiency, speed and precision of measuring the temperature with the measuring device.

Furthermore, with said embodiment it is complicated to manufacture and assemble some of the components of the measuring device, such as the plastic body which houses the temperature-sensitive element, due to the holes that must be made in said plastic body for housing the temperature-sensitive element and for the cables to pass through, which increases the manufacturing cost of the aforementioned plastic body, in addition to increasing the possibilities of the same being defective.

Likewise, the rear mounting of the temperature-sensitive element on the plastic body is also highly complex and makes automation of the constructive process of the measuring device difficult.

In another known embodiment, the temperature-sensitive element and the electric cables for the connection of the same to the electronic circuit are housed in a plastic body overmolded onto the same, and with such an arrangement, due to the fact that the temperature-sensitive element is overmolded onto the plastic body which houses the same, it is not possible to apply thermal grease to facilitate the thermal contact of temperature-sensitive element to the fluid to be controlled, which reduces the temperature-measuring efficiency.

Moreover, the overmolded body, in this case, adds an additional complexity to the manufacturing process of the measuring device, in turn increasing the production costs and the percentage of defects that could appear in the housing of the temperature-sensitive element, while in the assembly process of the temperature-sensitive element in the overmolded plastic body, the same is vulnerable to blows and accidental contact that could cause deterioration thereof.

Furthermore, in known devices that include the two functions, that of measuring temperature and measuring pressure, the pressure measuring is done by means of a pressure-sensitive cell, configured from a ceramic structure (which may be, for example, variable capacity, variable resistance, etc.), said pressure-sensitive cell also being connected to the electronic circuit of the measuring device, in an arrangement in which it rests against the plastic body which houses the temperature-sensitive element, in a perpendicular position to the longitudinal axis of the measuring device.

In that arrangement the pressure-sensitive cell rests against the plastic body at specific areas, which are usually the corners of the perimeter configuration of said pressure-sensitive cell, said specific areas being those that support the stresses exerted on said pressure-sensitive cell by the action of the fluid to be controlled and the counter pressure of the assembly in the functionality of the measuring device in the applications thereof.

With that arrangement, due to the fact that the pressure-sensitive cell only rests on the aforementioned specific areas, against the stresses that act on the same, it is necessary for the ceramic structure of said pressure-sensitive cell to have a considerable thickness to withstand the stresses acting in the pressure measuring, which increases the cost of the pressure-sensitive cell, which is necessary.

Furthermore, due to the position of the pressure-sensitive cell, in a perpendicular arrangement to the longitudinal axis of the measuring device, the perimeter dimension of the pressure-sensitive cell itself conditions the diameter dimension of the measuring device, possibly limiting the use thereof in some applications.

In light of all of the drawbacks and limitations of known solutions of devices that include the two functions of measuring the temperature and the pressure of fluids, it is therefore necessary to develop a solution that facilitates the productive process and optimizes the functional behavior of said measuring devices.

OBJECT OF THE INVENTION

According to the invention, a measuring device is proposed which includes the function of measuring the temperature and the function of measuring the pressure of fluids, with features that advantageously solve the drawbacks and limitations of current measuring devices of this type.

This measuring device object of the invention incorporates a temperature-sensitive element, which connects to an electronic circuit by means of electric conductors that are overmolded onto a plastic body that protrude through one end to be joined to the temperature-sensitive element outside of the mentioned plastic body.

In a preferred embodiment, protruding from the plastic body are ends of the electrical conductors to be joined by means of soldering to the temperature-sensitive element, joining the same outside of the plastic body.

In another preferred embodiment, the joint between the electrical conductors and the temperature-sensitive element is carried out by means of a printed circuit board, to which, on one side, the temperature-sensitive element is soldered and, on the other side, the ends of the electrical conductors are soldered.

In a third preferred embodiment, the electrical conductors are configured as a single piece, such as a printed circuit board, which is also overmolded onto the plastic body, such that the upper ends of the printed circuit board are joined to the electronic circuit and the lower end of the printed circuit board is joined to the temperature-sensitive element.

In this way, the constructive process of the measuring device is simplified, reducing the cost of the assembly of the temperature-sensitive element, thereby improving the effectiveness and the measuring time of the temperature, since the temperature-sensitive element is outside of the overmolded plastic body, able to receive the temperature of the fluid to be controlled by the measuring device in a more direct way.

The arrangement of the temperature-sensitive element outside of the overmolded plastic body also facilitates the automation of the constructive mounting process of the measuring device, further optimizing production costs.

The measuring device also comprises a pressure-sensitive cell, of a ceramic structure, which converts a pressure measurement into an electrical signal, for example by means of the principle of variable capacity, variable resistance, etc.

Said pressure-sensitive cell is arranged in a cavity defined on the side of the overmolded plastic body that supports the temperature-sensitive element, wherein disposed between the pressure-sensitive cell and the base of the cavity is a seal against which the pressure-sensitive cell rests, while arranged on the outer face of the pressure-sensitive cell is a plastic wedge element, which rests against the majority of the surface of that outer face of the pressure-sensitive cell and, specifically, against the projection on that face of the area of the other face that corresponds to the support seal, which is where the fluid of which the pressure is being measured acts.

Thus, thanks to the contact surface on the support of the wedge element, a firm rigidity of the assembly of the pressure-sensitive cell is achieved, allowing the compression of the support seal to be precisely controlled to obtain a suitable seal with respect to the fluid to be controlled, while at the same time improving the functional behavior of the pressure-sensitive cell, which can be of a smaller thickness to effectively withstand the force of the pressure, also allowing the costs of said pressures-sensitive cell to be reduced.

The wedge element that rests against the pressure-sensitive cell has, on the outer portion thereof, a curved configuration in a cylindrical arc, corresponding to the inner curvature of an outer metal body in which the functional assembly of the measuring device is housed, thereby facilitating the constructive assembly of the measuring device with the necessary precision of the compression of the support seal of the pressure-sensitive cell, which can be predetermine by the inner diameter of the metal body which houses the functional assembly.

In another aspect, the arrangement of the assembly of the pressure-sensitive cell, housed on the side of the plastic body in which it is incorporated, makes said pressure-sensitive cell remain in a position parallel to the longitudinal axis of the measuring device, through which it is possible to achieve a reduction in the diameter of the measuring device, facilitating the use thereof in applications where there is limited space.

Thus, the measuring device object of the invention has constructive and functional features that make the same advantageous for applications in which one must measure the temperature and pressure of fluids, acquiring a life of its own and preferential character with respect to conventional devices that are used for the same function.

DETAILED DESCRIPTION OF THE INVENTION

Figure 1:
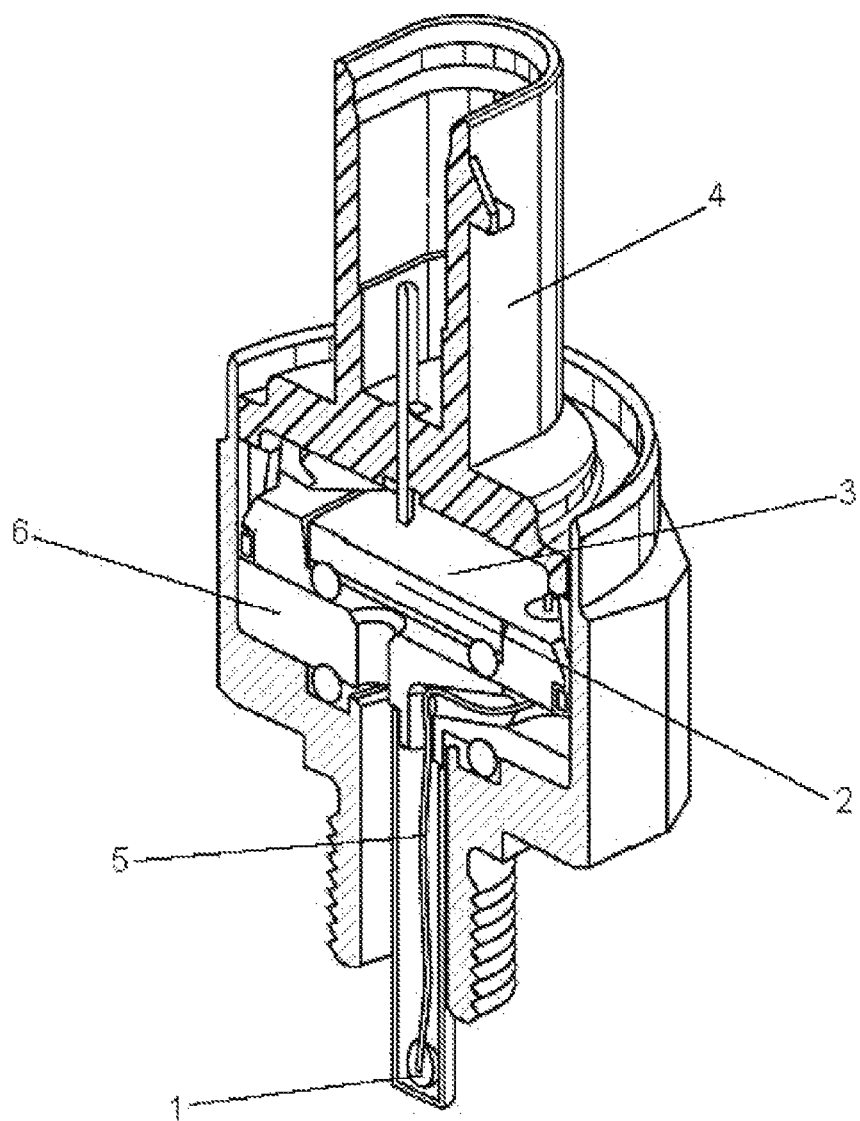
FIG. 1 shows a perspective cross-sectional view of a device for measuring temperature and pressure according to a conventional embodiment.

The object of the invention relates to a device for measuring temperature and pressure for controlling fluids in any application, integrating into a single mounted assembly, according to a conventional solution, such as the one represented by FIG. 1, a temperature-sensitive element (1), such as an NTC sensor, and a pressure-sensitive cell (2), formed by a ceramic cell, both being connected to an electronic circuit (3) to which, in turn, a connection connector (4) of the measuring device is connected in the system of application for which it is used.

The connection of the temperature-sensitive element (1) to the electronic circuit (3) is established by means of electrical conductors (5), which are overmolded onto a plastic body (6).

In a preferred embodiment, protruding from said plastic body (6) are ends of the electrical conductors (5) to be joined by means of soldering to the temperature-sensitive element (1), joining the same outside of the plastic body (6).

Figure 8:
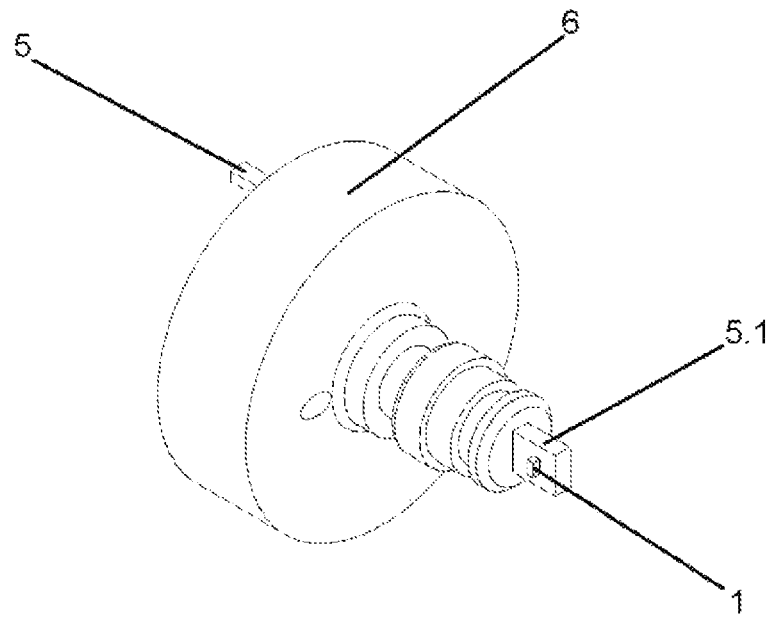
FIG. 8 shows a plastic body from which electrical conductors protrude, to which a printed circuit board is joined in which a temperature-sensitive element is soldered.

In another preferred embodiment (see FIG. 8), the joint between the electrical conductors (5) and the temperature-sensitive element (1) is done by means of a printed circuit board (5.1), to which, on one side, the temperature-sensitive element (1) is soldered and, on the other side, the ends of the electrical conductors are soldered (5).

Figure 9:
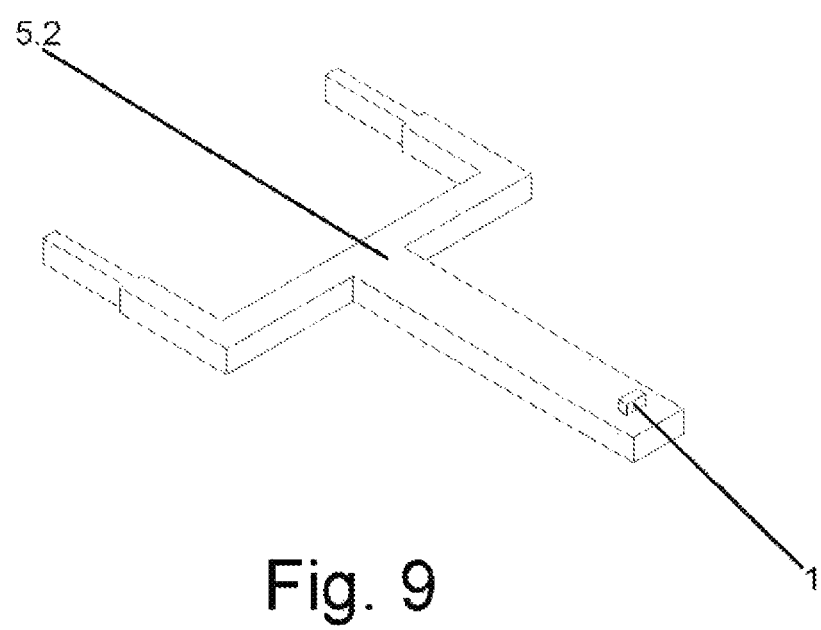
FIG. 9 is a view of electrical conductors configured as a single piece, such as, for example, a printed circuit board, on the lower end of which the temperature-sensitive element is soldered.

In a third preferred embodiment (see FIG. 9), the electrical conductors (5) are configured as a single piece, such as a printed circuit board (5.2), which is also overmolded onto the plastic body (6), such that the upper ends of the printed circuit board (5.2) are joined to the electronic circuit (3) and the lower end of the printed circuit board (5.2) is joined to the temperature-sensitive element (1).

Likewise, on the other side, the electrical conductors (5) extend to connect to the electronic circuit (3). According to a preferred but non-limiting embodiment, the joint of the mentioned electrical conductors (5) with respect to the electronic circuit (3) is envisaged by means of springs (7).

The temperature-sensitive element (1) can be uncovered outside of the plastic body (6) to have direct contact with the fluid to be controlled by means of the measuring device, or can be incorporated in a covering metal bulb (8) filled with conductive thermal grease that is in contact with the temperature-sensitive element (1).

In this case, according to the invention, the pressure-sensitive cell (2) is arranged housed in a cavity (9) defined on the side of the plastic body (6), resting against a seal (10) which is included disposed between said pressure-sensitive cell (2) and the base of the mentioned housing cavity (9), around the mouth of a conduit (11) through which the pressure of the fluid to be controlled is transmitted onto the pressure-sensitive cell (2).

A plastic wedge element (12) is incorporated on the outer face of the pressure-sensitive cell (2) which presses against the pressure-sensitive cell (2) so that the seal (10) is compressed, establishing the necessary seal to prevent the passage of the fluid being controlled to the electronic circuit (3).

The functional assembly that integrates the temperature-sensitive element (1) and the pressure-sensitive cell (2) is arranged in a metal body (13), which is closed with the connector (4), the metal body (13) being defined with an inner diameter that coincides with the periphery diameter of the plastic body (6).

Furthermore, the wedge element (12) has a flat face which rests against the pressure-sensitive cell (2), said wedge element (12) having, on the outer face, a surface in the form of a cylindrical arc, which adjusts with respect to the inner surface of the metal body (13), such that the wedge element (12) establishes, by the simple arrangement of the assembly, the necessary push against the pressure-sensitive cell (2) so that the seal (10) remains compressed, establishing a proper seal on the base of the cavity (9).

Figure 6B:
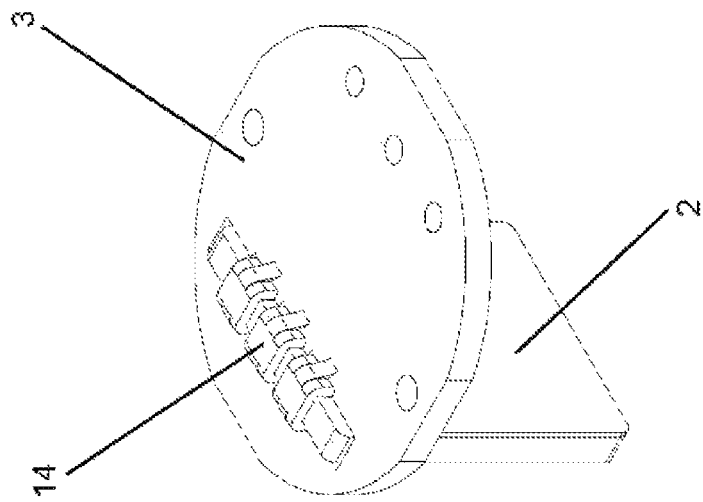
FIG. 6B is a perspective view of the joined assembly of the preceding figure.
Figure 6A:
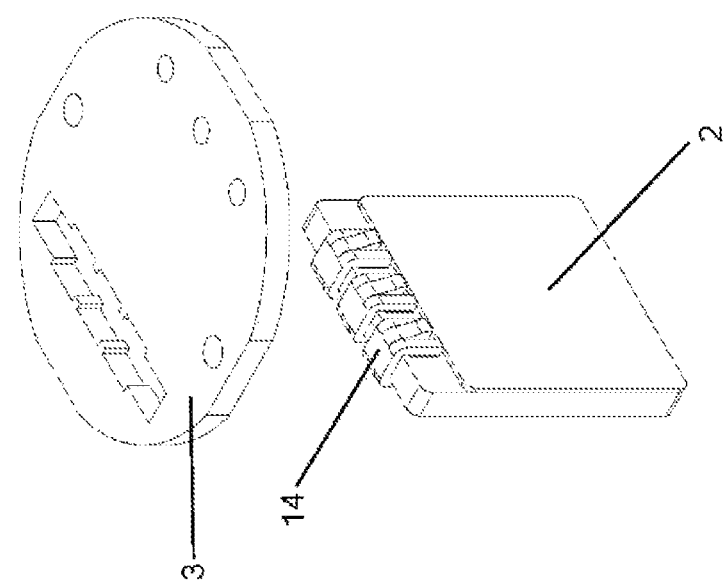
FIG. 6A is a detailed exploded perspective view of a possible embodiment of the joint of the pressure-sensitive cell with respect to the printed circuit board on the measuring device object of the invention.
Figure 7B:
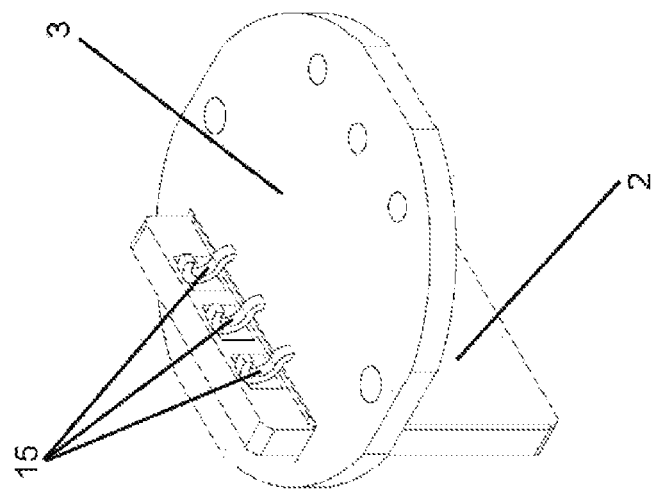
FIG. 7B is a perspective view of the joined assembly of the preceding figure.
Figure 7A:
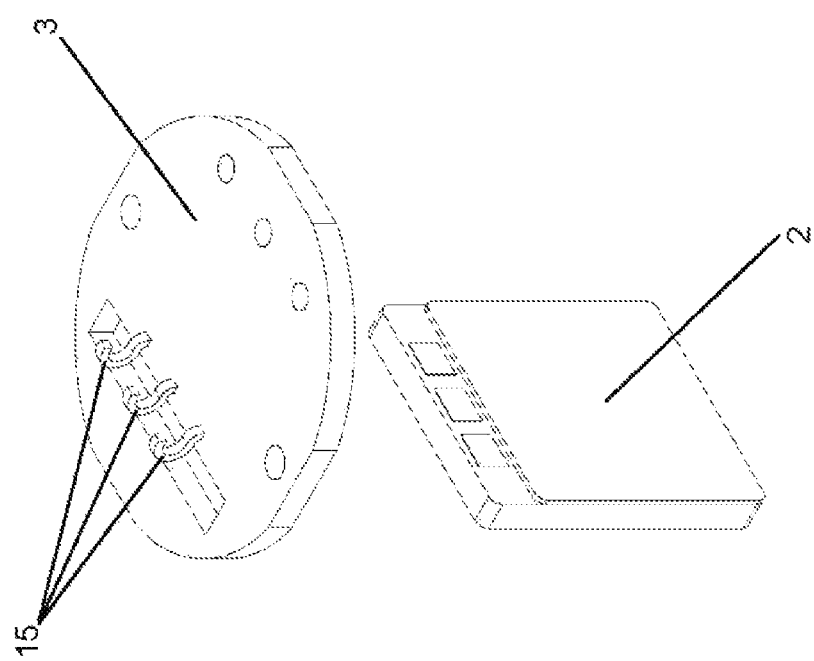
FIG. 7A is a detailed exploded perspective view of another possible embodiment of the joint of the pressure-sensitive cell with respect to the printed circuit board on the measuring device object of the invention.

In the constructive assembly of the measuring device, the pressure-sensitive cell (2) can electrically connect to the electronic circuit (3) by means of clips (14) soldered to the pressure-sensitive cell (2) which establish electric contact with the electronic circuit (3) by means of tabs that are inserted by pressure in metalized windows, as seen in the embodiment of FIGS. 6A and 6B, or can be connected by means of elastic bands (15) soldered to the electronic circuit (3) which establish electrical contact by pressure with the pressure-sensitive cell (2), as seen in the embodiment of FIGS. 7A and 7B.

Figure 2:
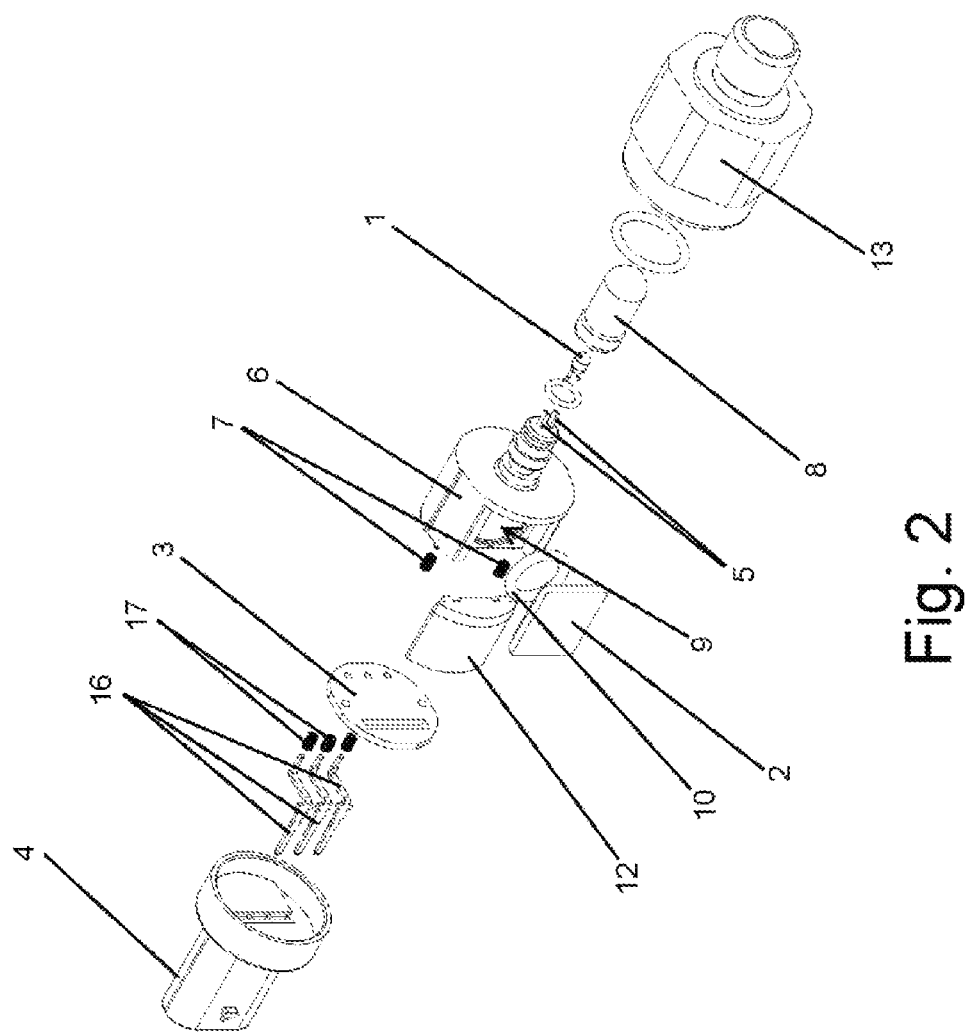
FIG. 2 shows an exploded perspective view of an exemplary embodiment of a device for measuring temperature and pressure according to the object of the invention.
Figure 3:
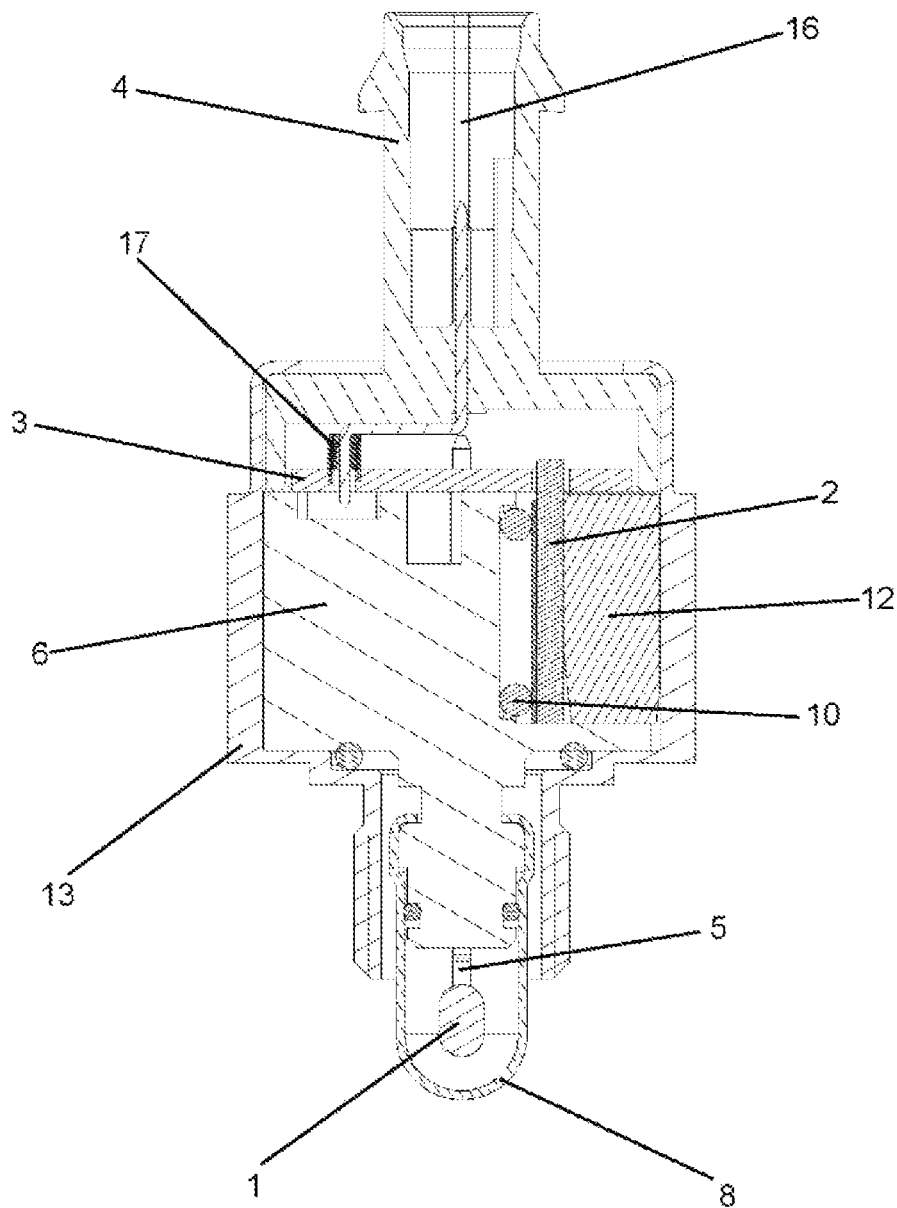
FIG. 3 is a longitudinal cross-sectional view of the mounted assembly of the measuring device of the preceding figure.
Figure 4:
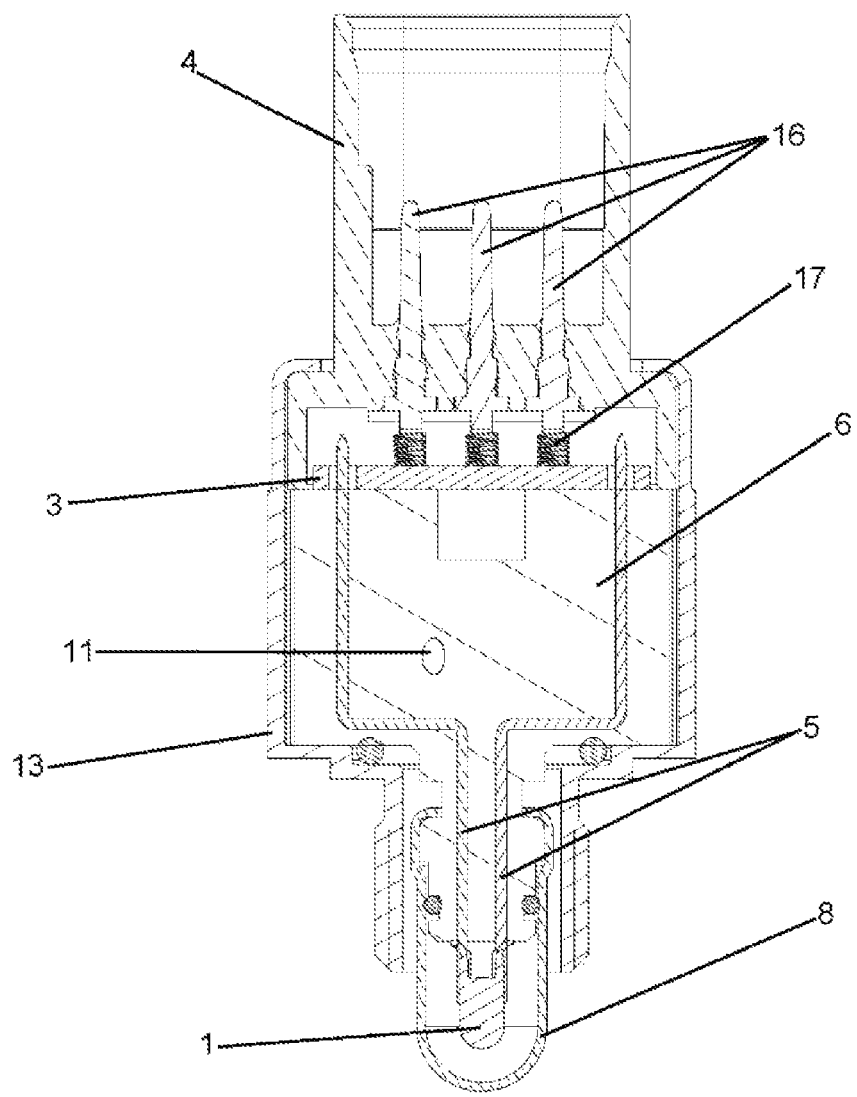
FIG. 4 is a longitudinal cross-sectional view of the same measuring device object of the invention, with a cutting plane perpendicular to that of the preceding figure.
Figure 5:
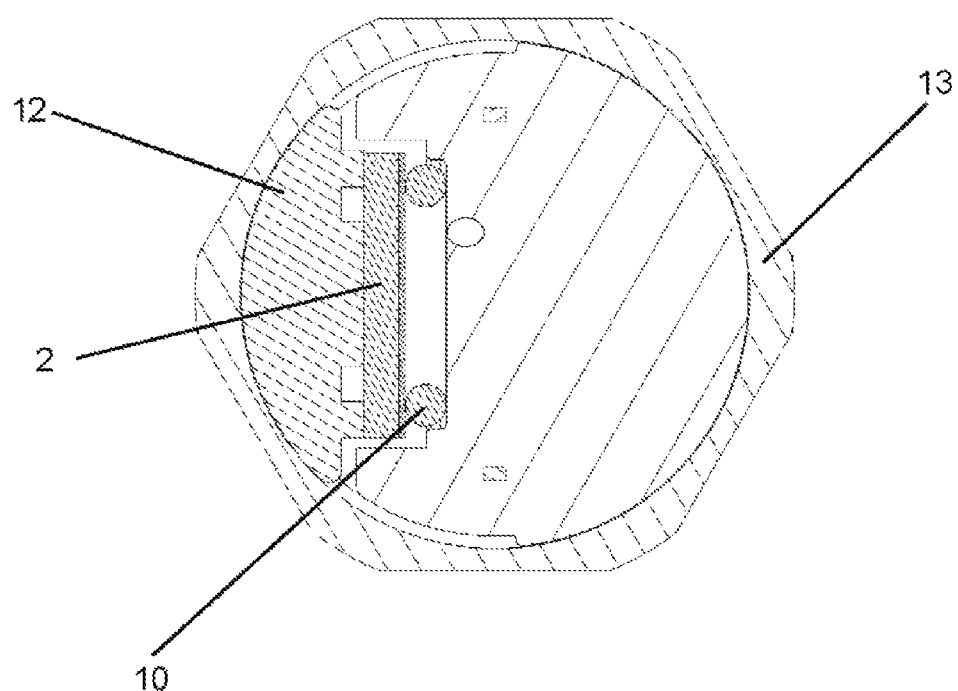
FIG. 5 is a transverse cross-sectional view of the measuring device, with a cutting plane that corresponds to the printed circuit board.

The connector (4) has, in this case, terminals (16) which connect to the electronic circuit (3), the joint of said terminals (16) to the electronic circuit (3) directly established by soldering or, preferably, by means of springs (17), according to the embodiment of FIGS. 2, 3 and 4.

The invention claimed is:

1. A device for measuring the pressure and temperature of fluids comprising a metal body connected to a connector,
    the metal body housing a temperature-sensitive element and a pressure-sensitive cell arranged connected to an electronic circuit;
    the connector comprising terminals which connect to the electronic circuit;
    the metal body defining an inner diameter that coincides with a periphery of a plastic body and a wedge element;
    a cavity defined on one side of the plastic body through which electric conductors pass, connect the temperature-sensitive element to the electronic circuit, wherein the pressure-sensitive cell rests against a seal disposed between said pressure-sensitive cell and a base of the cavity;
    the wedge element placed over the pressure-sensitive cell which rests against said pressure-sensitive cell to compress the seal thereby providing a seal around a mouth of a conduit through which the pressure of the fluid to be controlled is transmitted onto the pressure-sensitive cell.

2. The device for measuring the pressure and temperature of fluids according to claim 1, wherein the wedge element has a flat face which rests against the pressure-sensitive cell, while an outer face has a surface of a cylindrical arc shape, which adjusts with respect to an inner surface of the metal body.

3. The device for measuring the pressure and temperature of fluids according to claim 1, wherein the pressure-sensitive cell is connected to the electronic circuit by means of clips which are soldered to said pressure-sensitive cell and which establish electrical contact with the electronic circuit.

4. The device for measuring the pressure and temperature of fluids according to claim 1, wherein the pressure-sensitive cell is connected to the electronic circuit by means of elastic bands which are soldered to the electronic circuit and which apply contact pressure to the pressure-sensitive cell.

* * * * *